(12) United States Patent
Kado et al.

(10) Patent No.: US 8,587,167 B2
(45) Date of Patent: Nov. 19, 2013

(54) BRUSHLESS MOTOR AND ELECTRIC DEVICE USING SAME

(75) Inventors: Haruhiko Kado, Osaka (JP); Akihiko Watanabe, Osaka (JP); Hirofumi Mizukami, Osaka (JP); Takehiko Hasegawa, Osaka (JP)

(73) Assignee: Panasonic Corporation, Osaka (JP)

( * ) Notice: Subject to any disclaimer, the term of this patent is extended or adjusted under 35 U.S.C. 154(b) by 43 days.

(21) Appl. No.: 13/132,247

(22) PCT Filed: Dec. 11, 2009

(86) PCT No.: PCT/JP2009/006779
§ 371 (c)(1),
(2), (4) Date: Jun. 1, 2011

(87) PCT Pub. No.: WO2010/067614
PCT Pub. Date: Jun. 17, 2010

(65) Prior Publication Data
US 2011/0234025 A1    Sep. 29, 2011

(30) Foreign Application Priority Data

Dec. 11, 2008  (JP) .................................. 2008-315365

(51) Int. Cl.
*H02K 11/00*    (2006.01)
*H02P 25/08*    (2006.01)
*H02P 6/10*    (2006.01)

(52) U.S. Cl.
USPC ..... 310/68 R; 310/71; 318/254.1; 318/400.23

(58) Field of Classification Search
USPC .................. 310/68 B, 71; 318/254.1, 400.23
See application file for complete search history.

(56) References Cited

U.S. PATENT DOCUMENTS

| 6,528,916 B1 * | 3/2003 | Naito et al. ..................... 310/71 |
| 7,619,334 B2 | 11/2009 | Nanbu et al. |
| 2006/0175917 A1 | 8/2006 | Nanbu et al. |
| 2010/0019629 A1 | 1/2010 | Amaya et al. |

FOREIGN PATENT DOCUMENTS

| EP | 1 608 052 A2 | 12/2005 |
| EP | 1 705 778 A1 | 9/2006 |
| JP | 06-178494 A | 6/1994 |
| JP | 06261512 A * | 9/1994 |
| JP | 07-087696 A | 3/1995 |
| JP | 7-87696 A | 3/1995 |

(Continued)

OTHER PUBLICATIONS

Machine Trnaslation JP07087696 (1995) JP06261512 (1994).*

(Continued)

*Primary Examiner* — Tran Nguyen
*Assistant Examiner* — Jose Gonzalez Quinones
(74) *Attorney, Agent, or Firm* — Brinks Hofer Gilson & Lione

(57) ABSTRACT

A motor includes: a stator molded integrally with an insulating resin having a fixing member including a stator iron core and a winding wound thereon; a rotor arranged to face the stator about a shaft; a bearing rotatably supporting the shaft; a bracket fixing the bearing; and a drive circuit substrate having a drive circuit mounted thereon for driving the winding. The stator iron core is electrically connected to a ground serving as a reference point of a zero potential on the drive circuit substrate through a conductive member.

5 Claims, 5 Drawing Sheets

(56) References Cited

FOREIGN PATENT DOCUMENTS

| JP | 07087696 A | * | 3/1995 |
| JP | 08-070557 A | | 3/1996 |
| JP | 08-317604 A | | 11/1996 |
| JP | 8-317604 A | | 11/1996 |
| JP | 09149602 A | * | 6/1997 |
| JP | 2001-128431 A | | 5/2001 |
| JP | 2003-037956 A | | 2/2003 |
| JP | 2005-354795 A | | 12/2005 |
| JP | 2007-159302 A | | 6/2007 |
| WO | WO 2007/139129 A1 | | 12/2007 |

OTHER PUBLICATIONS

Machine Translation JP09149602 (1997).*
European Search Report in corresponding European Patent Application No. 09831720.9, dated Aug. 1, 2012, 9 pages.
International Search Report for International Application No. PCT/JP2009/006779, dated Jan. 26, 2010, 2 pages.

* cited by examiner

BRUSHLESS MOTOR AND ELECTRIC DEVICE USING SAME

This application is a 371 application of PCT/JP2009/006779 having an international filing date of Dec. 11, 2009, which claims priority to JP2008-315365 filed on Dec. 11, 2008, the entire contents of which are incorporated herein by reference.

TECHNICAL FIELD

The present invention relates to motors and, more particularly, to a motor that is improved to suppress electric corrosion from occurring in a bearing.

BACKGROUND ART

In recent years, a motor has often employed a method in which a motor is driven by an inverter using a pulse width modulation system (to be referred to as a PWM system hereinafter). In the inverter driving of the PWM system, since a neutral-point potential of a winding is not zero, a potential difference (to be referred to as a shaft voltage hereinafter) is generated between an outer ring and an inner ring of a bearing. The shaft voltage includes a high-frequency signal obtained by switching. When the shaft voltage reaches a breakdown voltage of an oil film in the bearing, a minute electric current flows in the bearing to cause electric corrosion in the bearing. When the electric corrosion progresses, a wavelike abrasion phenomenon may occur on a bearing inner ring, a bearing outer ring, or bearing balls to generate abnormal sound, and the abnormal sound is one main factor of drawback in the motor.

Conventionally, in order to suppress electric corrosion, the following measure is conceived.

(1) The bearing inner ring and the bearing outer ring are electrically conductive to each other.

(2) The bearing inner ring and the bearing outer ring are electrically insulated from each other.

(3) A shaft voltage is reduced.

As a concrete method for the (1), a method of giving conductivity to a lubricant agent of the bearing is given. However, a conductive lubricant agent is deteriorated in conductivity with elapsed time, and lacks in sliding reliability. A method of arranging a brush on a rotating shaft to set a conductive state may be conceived. However, this method disadvantageously requires brush abrasion powder or a space.

As a concrete method of the (2), a method of changing iron balls in the bearing with nonconducting ceramic balls is given. This method highly effectively suppresses electric corrosion but disadvantageously has high cost. The method cannot be employed in a general-purpose motor.

As a concrete method of the (3), a method of electrically short-circuiting a stator iron core to a conductive metal bracket to change a capacitance to reduce shaft voltage is conventionally known (for example, see Patent Document 1).

An impedance obtained when an electric capacity and a resistor are connected in parallel with each other is expressed by a relational expression: $Z=1/j\omega C+R$. In this expression, Z denotes an impedance, j denotes an imaginary number, $\omega$ denotes an angular frequency, C denotes a capacitance, and R denotes a resistance. As is apparent from expression, when the capacitance increases or when the resistance decreases, the impedance decreases. In contrast to this, when the capacitance decreases or when the resistance increases, the impedance increases.

In Patent Document 1, the stator iron core and the bracket are short-circuited to decrease an impedance on the stator side. In this manner, the bearing is suppressed from being electrically corroded.

More specifically, in general, a motor that is used in a washing machine, a dishwasher, or the like near water and that may electrocute a person needs not only to have a charging unit insulated (basic insulation) but also to be additionally independently insulated (to be referred to as additional insulation hereinafter). On the other hand, since a motor that is used in an indoor unit or an outdoor unit of an air conditioner, a water heater, an air purifier, or the like in addition to a washing machine, a dishwasher, or the like may not electrocute a person, the motor does not require additional insulation. Therefore, since the motor that is used in an indoor unit or an outdoor unit of an air conditioner, a water heater, an air purifier, or the like does not have an insulated rotor, an impedance on the rotor side (bearing inner ring side) is at a low level. In contrast to this, since the stator side (bearing outer ring side) has an insulated structure, an impedance is at a high level. In this case, a potential on the bearing inner ring side is high, and a potential on the bearing outer ring is low. For this reason, an imbalanced state occurs, a high shaft voltage is consequently generated. The high shaft voltage may cause electric corrosion in the bearing.

In order to avoid the state, Patent Document 1 employs a method that short-circuits the stator iron core and the bracket to each other to eliminate a capacitance component therebetween and, as described above, decreases the impedance on the stator side (bearing outer ring side) to approximate the impedance to the impedance on the rotor side (bearing inner ring side).

However, the conventional method as described in Patent Document 1 has the following problem. More specifically, the conventional method is a method that changes an impedance on a stator side to keep a potential balance between the bearing inner ring and the bearing outer ring to try to suppress electric corrosion. In this method, when an impedance balance was broken by a using environment of the motor or a variation in assembling accuracy of the stator and the rotor, on the contrary, a case in which the shaft voltage became high to easily cause electric corrosion was considered as a possible case.

Patent Document 1: Unexamined Japanese Patent Publication No. 2007-159302

DISCLOSURE OF THE INVENTION

The present invention provides a motor in which electric corrosion is suppressed from occurring in a bearing and an electric device using the same. The motor according to the present invention includes: a stator molded integrally with an insulating resin having a fixing member including a stator iron core and a winding wound thereon; a rotor arranged to face the stator about a shaft; a bearing rotatably supporting the shaft; a bracket fixing the bearing; and a drive circuit substrate having a drive circuit mounted thereon for driving the winding, wherein the stator iron core is electrically connected to a ground serving as a reference point of a zero potential on the drive circuit substrate through a conductive member.

With this configuration, since the stator iron core considered as a voltage generator that induces high-frequency voltages to a bearing inner ring and a bearing outer ring is connected to the ground on the drive circuit substrate through the

DETAILED DESCRIPTION OF THE PREFERRED EMBODIMENTS

A motor according to the present invention and an electric device using the same will be described below with reference to the drawings.

Embodiment 1

Figure 1:
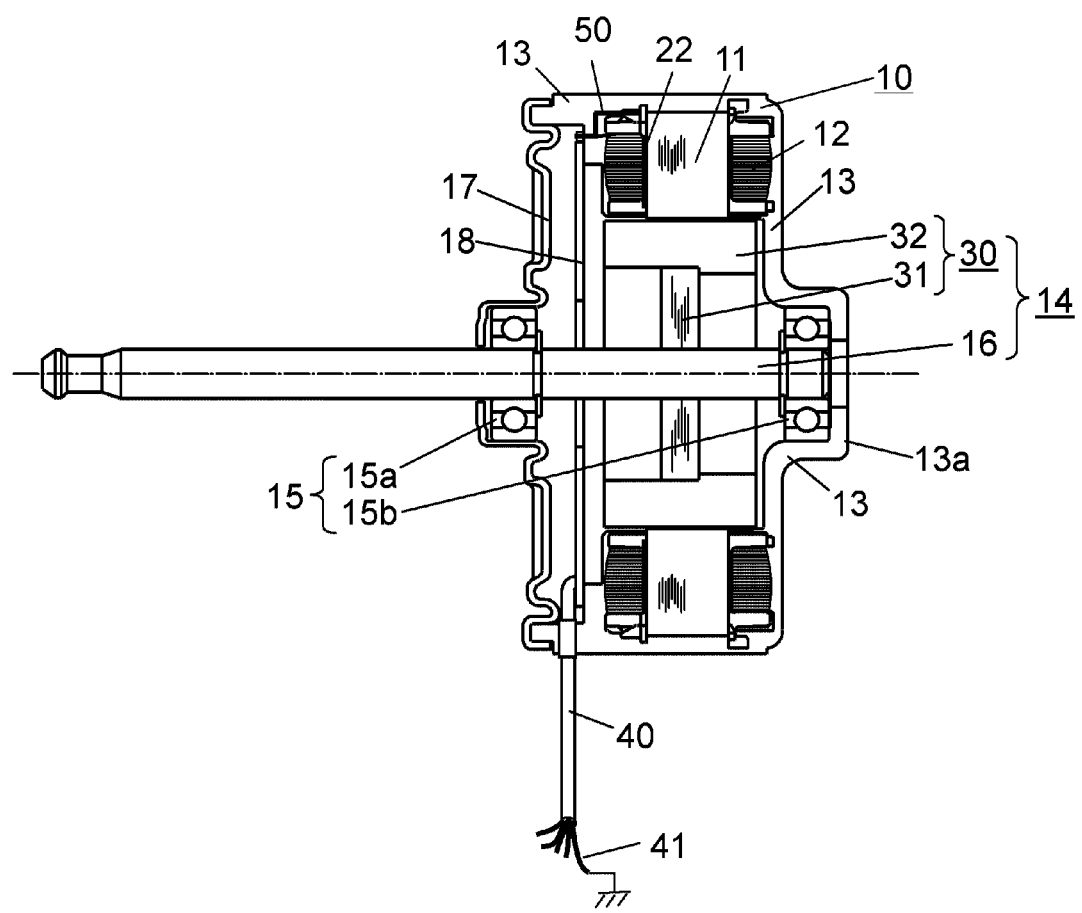
FIG. 1 is a structural diagram showing a cross section of a motor according to Embodiment 1 of the present invention.

FIG. 1 is a structural diagram showing a cross section of a motor according to Embodiment 1 of the present invention. In the present embodiment, an example of a motor that is a brushless motor to drive a blowing fan in an indoor unit mounted for an air conditioner serving as an electric device will be described. In the present embodiment, an example of an inner rotor type motor in which a rotor is rotatably arranged on an inner circumference side of a stator will be described.

In FIG. 1, on stator iron core 11, stator winding 12 serving as a winding is wound on insulator 22 serving as a resin that insulates stator iron core 11. Stator iron core 11 is molded together with another fixing member with insulating resin 13 serving as a molding material. In the present embodiment, the members are integrally molded in such a manner to configure stator 10 having a generally cylindrical shape as an outer shape.

Inside stator 10, rotor 14 is inserted via a gap (not shown). Rotor 14 has disk-like rotating body 30 including rotor iron core 31 and shaft 16 that fastens rotating body 30 to penetrate the center of rotating body 30. Rotor iron core 31 has a plurality of permanent magnets in a circumferential direction to cause the permanent magnets to face the inner circumference side of stator 10. FIG. 1 shows a configuration in which rotor iron core 31 and ferrite resin magnet 32 serving as a permanent magnet are integrally molded. In this manner, the inner circumference side of stator 10 and an outer circumference side of rotating body 30 are arranged to face each other.

Two bearings 15 that support shaft 16 are fixed to shaft 16 of rotor 14. Bearing 15 is a cylindrical bearing having a plurality of iron balls, and an inner ring side of bearings 15 is fixed to shaft 16. In FIG. 1, on an output shaft side serving as a side on which shaft 16 projects from a brushless motor body, bearing 15a supports shaft 16. On the opposite side (to be referred to as an anti-output shaft side hereinafter), bearing 15b supports shaft 16. Bearing 15a on the output shaft side has an outer ring side fixed with metal bracket 17 having conductivity. Bering 15b on the anti-output shaft side has an outer ring side fixed with insulating resin 13 that integrally molds bearing 15b. With this configuration, shaft 16 is supported by two bearings 15, and rotor 14 is rotatably rotated.

Furthermore, in the brushless motor, drive circuit substrate 18 on which a drive circuit including a control circuit is mounted is built in. After drive circuit substrate 18 is built in, bracket 17 is press-fitted in stator 10 to form a brushless motor. Connection wiring 40 including a lead wiring, ground wiring 41, and the like that applies power supply voltage Vdc for the winding, power supply voltage Vcc for the control circuit, and control voltage Vsp that controls a rotating speed are connected to drive circuit substrate 18. Ground wiring 41 included in connection wiring 40 is connected to the ground on drive circuit substrate 18. The ground is, on drive circuit substrate 18, a reference point of a zero potential for which a reference potential having a zero voltage is set. A wiring pattern serving as a ground line is arranged on drive circuit substrate 18. More specifically, ground wiring 41 included in connection wirings 40 is connected to a ground line on driving circuit substrate 18.

The ground on drive circuit substrate 18 on which the drive circuit is mounted is insulated from the earth and the primary (power supply) circuit and floats on the earth and the potential of the primary (power supply) circuit. A power supply circuit that is connected to drive circuit substrate 18 on which the drive circuit is mounted and supplies a power supply voltage for the winding, a power supply circuit that supplies a power supply voltage for the control circuit, the lead wiring and ground wiring 41 that apply a control voltage, and the like are insulated from the earth. More specifically, the power supply circuits, ground wiring 41, and the like are electrically insulated from all a primary (power supply) circuit for the power supply circuit that supplies the power supply voltage for the winding, a primary (power supply) circuit for the power supply circuit that supplies the power supply voltage to the control circuit, the earth connected to the primary (power supply) circuits, and the earth that is independently grounded. More specifically, since the drive circuits mounted on drive circuit substrate 18 are electrically insulated from the primary (power supply) circuit potential and the potential of the earth, the drive circuits are in a floating state. This is a state in which the potential floats. For this reason, a configuration including the power supply circuit that supplies the power supply voltage for the winding and the power supply circuit that supplies the power supply voltage for the control circuit, the power supply circuits being connected to drive circuit substrate 18, is also called a floating power supply.

The brushless motor according to the present embodiment has a characteristic feature in that stator iron core 11 is electrically connected to the ground line serving as a reference point of a zero potential on drive circuit substrate 18 through conductive member 50 serving as conductive member.

When the power supply voltages and a control signal are supplied to the brushless motor configured as described above through connection wirings 40, the drive circuit on drive circuit substrate 18 causes a drive current to flow in stator winding 12, and a magnetic field is generated from stator iron core 11. By the magnetic field from stator iron core 11 and the magnetic field from ferrite resin magnet 32, an attractive force and a repulsive force are generated depending on the polarities of the magnetic fields, and the forces rotate rotor 14 about shaft 16.

A more detailed configuration of the brushless motor will be described below. In the brushless motor, as described above, shaft 16 is supported by two bearings 15, one bearing 15a is fixed by metal bracket 17, and other bearing 15b is fixed by insulating resin 13.

More specifically, bearing 15b on the anti-output shaft side is fixed by a hollow cylindrical portion of insulating resin 13 having a size almost equal to an outer circumference diameter of bearing 15b. More specifically, as shown in FIG. 1, the shape of insulating resin 13 on the anti-output shaft side is a shape including main-body projecting portion 13a projecting from the main body of the brushless motor toward the anti-output shaft. The inner side of main-body projecting portion 13a has a hollow cylindrical shape. The diameter of the hollow cylindrical portion of the hollow cylindrical shape is almost equal to the outer circumference diameter of bearing 15b. Bering 15b is inserted into the hollow cylindrical portion to fix bearing 15b to insulating resin 13. In this manner, bearing 15b is arranged on the inner side of the main body of main-body projecting portion 13a.

Bearing 15a on the output shaft side is fixed by bracket 17 having an outer circumference diameter almost equal to an outer circumference diameter of stator 10. Bracket 17 has an almost disk-like shape and has a projecting portion having a diameter almost equal to the outer circumference diameter of bearing 15a at the center of the disk, and the inner side of the projecting portion is hollow.

After drive circuit substrate 18 is built-in, the inner side of the projecting portion of bracket 17 is inserted into bearing 15a. Accordingly, when bracket 17 is press-fitted on stator 10 such that a connection terminal arranged on the outer circumference of bracket 17 is fitted on a connection terminal of stator 10, the brushless motor is formed. With the above configuration, an assembling operation is made easy, and the outer ring side of bearing 15a is fixed to metal bracket 17. For this reason, bearing 15a can be strongly fixed.

When the brushless motor configured as described above is electrically considered, as described above, an impedance on the rotor side (bearing inner ring side) is at a low level, and an impedance on the stator side (bearing outer ring side) is at a high level. More specifically, when, as the impedance on the rotor side, an impedance between stator iron core 11 and the inner rings of bearings 15 is considered, stator iron core 11 and rotating body 30 face each other via a small gap, and rotating body 30 and shaft 16 are conductors. For this reason, it can be determined that an impedance therebetween is at a low level. Furthermore, since the impedance between is low, a high-frequency signal generated from stator iron core 11 reaches the inner rings of bearings 15 without being attenuated. As a result, it is considered that a high-potential high-frequency voltage is generated at the inner rings of bearings 15.

In contrast to this, when, as an impedance on the stator side, an impedance between stator iron core 11 and the outer rings of bearings 15 is considered, for example, bracket 17 connected to the outer ring of bearing 15a is arranged with a certain interval from stator iron core 11. For this reason, it can be determined that the impedance therebetween is at a high level. Furthermore, since the impedance between is high, a high-frequency signal generated from stator iron core 11 is attenuated to reach the outer rings of bearings 15. As a result, it is considered that a low-potential high-frequency voltage is generated at the outer rings of bearings 15.

In this manner, since the impedances on the rotor side and the stator side are imbalanced, a potential difference between the inner ring and the outer ring of the bearing, i.e., a shaft voltage may be generated to cause electric corrosion in the bearing. In particular, as a generating source of a signal that generates the shaft voltage, a stator iron core on which a winding driven by switching high-frequency waves of a PWM system is wound is mainly conceived. More specifically, the winding driven by a high-frequency current is wound on the stator iron core, a magnetic flux generated by a drive current and a high-frequency signal generated by a drive high-frequency wave are generated in the stator iron core, and the generated high-frequency signal may also be induced to the bearing inner ring and the bearing outer ring through a space.

In the brushless motor according to the present embodiment, in order to suppress electric corrosion from being generated, stator iron core 11 is electrically connected to the ground wiring on drive circuit substrate 18 through conductive member 50.

More specifically, in the present embodiment, stator iron core 11 serving as a main generating source for a high-frequency signal that generates a shaft voltage is connected to the ground line on drive circuit substrate 18 to set the potential of stator iron core 11 to a zero potential and to lower the shaft voltage. In this manner, electric corrosion is suppressed from being generated in the bearing.

Figure 2:
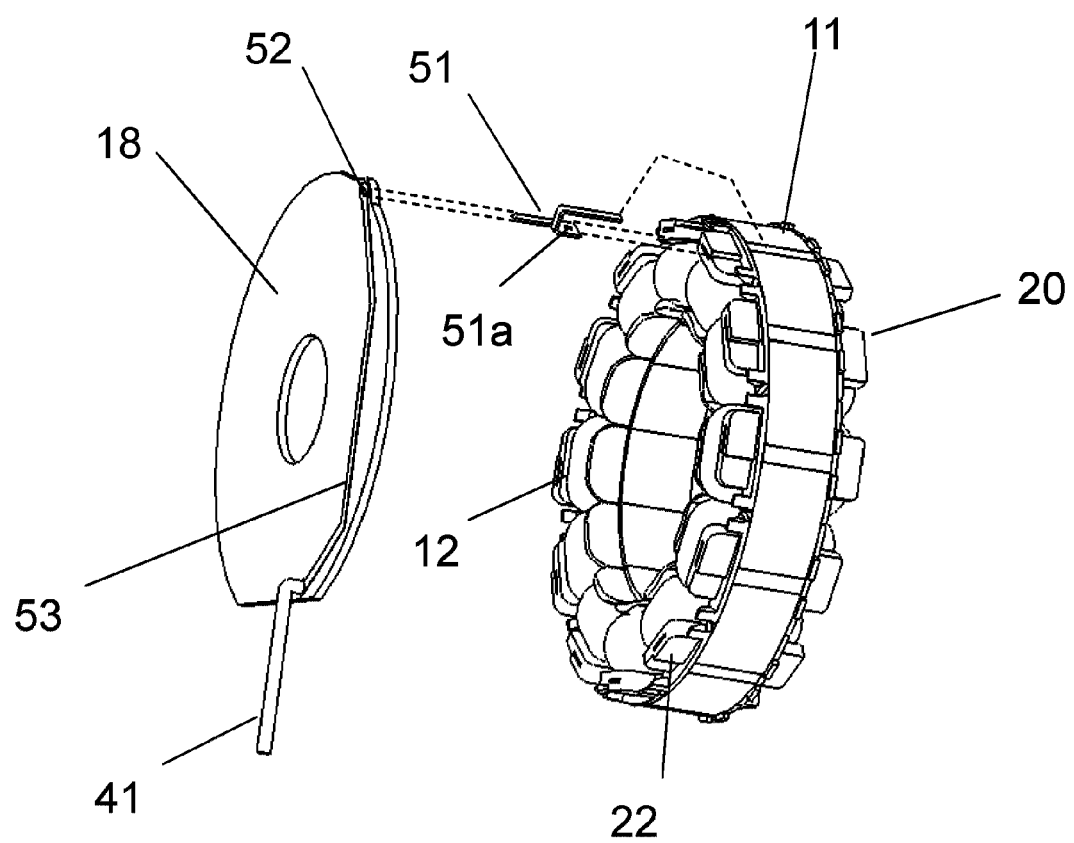
FIG. 2 is a partial developed perspective view of the motor according to Embodiment 1 of the present invention.

FIG. 2 is a partial developed perspective view of a brushless motor serving as a motor according to Embodiment 1 of the present invention. In FIG. 2, examples of winding assembly 20 obtained by winding stator winding 12 on stator iron core 11, drive circuit substrate 18, and iron core connection terminal 51 serving as conductive member 50 connecting winding assembly 20 and drive circuit substrate 18 to each other are described.

As shown in FIG. 2, stator iron core 11 on which stator winding 12 is wound has an annular shape, and insulator 22 that insulates stator iron core 11 is interposed between stator iron core 11 and stator winding 12. Driving circuit substrate 18 has an annular shape in which a hole to cause shaft 16 to penetrate is formed at the center.

In the present embodiment, after iron core connection terminal 51 is inserted and fixed in insulator 22, iron core connection terminal 51 is in contact with or welded on the outer circumference portion of stator iron core 11. Iron core connection terminal 51 has a fork-like shape on a one-end side in the longitudinal direction, and has a pin-like shape on the other-end side. When the fork-like portion of iron core connection terminal 51 on insulator 22 side is inserted into insulator 22 such that insulator 22 and the outer circumference portion of stator iron core 11 are sandwiched by the fork-like portion of iron core connection terminal 51, iron core connection terminal 51 is fixed to stator iron core 11. Since iron core connection terminal 51 has the above shape, iron core connection terminal 51 can be easily fixed to stator iron core 11. One of the fork-like portion being in contact with the outer circumference portion of stator iron core 11 is welded on the outer circumference portion to strongly fix iron core connection terminal 51 to stator iron core 11 and to secure an electric connection. As a material of iron core connection terminal 51, a material (for example, phosphor bronze) having spring characteristics, plated brass that can be welded and soldered, or the like is preferably used. As shown in FIG. 2, hole 51a is arranged on insulator 22 side of the fork-like portion of iron core connection terminal 51, and a convex portion (not shown) is arranged at a position corresponding to hole 51a of insulator 22 to make it possible to reliably fix iron core connection terminal 51 to stator iron core 11 while being easily positioned.

On the other hand, the other end of the pin-like shape that is not connected to stator iron core 11 of iron core connection terminal 51 is connected and fixed to land 52 of drive circuit substrate 18 by soldering. Various electronic parts (not shown) are mounted on drive circuit substrate 18, and the electronic parts are electrically connected to each other by a wiring pattern pattern-formed with a copper foil on drive circuit substrate 18. In FIG. 2, as a typical wiring pattern, only ground pattern 53 for the ground line is shown. Ground wiring 41 included in connection wiring 40 is connected to one end of ground pattern 53. Ground pattern 53 extends from the connection portion connected to ground wiring 41 on drive circuit substrate 18, and land 52 having a hole is formed at the other end of ground pattern 53. A pin-like end portion of iron core connection terminal 51 is inserted into the hole of land 52, and land 52 and the end portion of iron core connection terminal 51 are connected and fixed to each other by soldering to electrically connect iron core connection terminal 51 and ground wiring 41 to each other. More specifically, stator iron core 11 is electrically connected to ground wiring 41 through iron core connection terminal 51 and ground pattern 53.

The brushless motor is manufactured according to the following steps. Stator winding 12 is wound on stator iron core 11 including insulator 22 to form winding assembly 20 as shown in FIG. 2. Iron core connection terminal 51 is inserted into winding assembly 20 formed as described above, and iron core connection terminal 51 is welded on the outer circumference portion of stator iron core 11. Thereafter, winding assembly 20 is molded with insulating resin 13 to form stator 10. At this time, stator 10 is formed such that a distal end portion that is the pin-like shape of iron core connection terminal 51 is exposed from insulating resin 13 and projects. Rotor 14 to which bearings 15 is attached is inserted into stator 10 formed as described above. More specifically, bearing 15b is inserted into a hollow cylindrical portion in stator 10 to fix bearing 15b to stator 10. Driving circuit substrate 18 is inserted from the output shaft side. The hole of land 52 on drive circuit substrate 18 is arranged in iron core connection terminal 51 projecting from stator 10 and the land and iron core connection terminal 51 are connected and fixed to each other by soldering. Thereafter, the inner side of the projecting portion of bracket 17 is inserted into bearing 15a, and bracket 17 is press-fitted in stator 10 such that the connection terminal formed on the outer circumference of bracket 17 and the connection terminal of stator 10 are fitted to each other. In this manner, the brushless motor is formed.

In the above embodiment, stator iron core 11 serving as a main generating source for a high-frequency signal that generates a shaft voltage is electrically connected to ground wiring 41 through iron core connection terminal 51 and ground pattern 53 as described above. With the configuration, the potential of stator iron core 11 becomes a zero potential with a simple configuration, and the high-frequency signal generated in stator iron core 11 can be attenuated. Therefore, since a potential of the high-frequency signal induced from stator iron core 11 to the bearing inner ring and the bearing outer ring can be suppressed, the shaft voltage can also be suppressed. In this manner, the bearing can be suppressed from being electrically corroded.

The present invention will be described in detail with reference to examples. The present invention is not limited to the following examples. The present invention is not intended to be limited by the examples without departing from the spirit and scope of the invention.

Example 1

In the example, a shaft voltage obtained when stator iron core 11 of the brushless motor shown in FIG. 1 was connected to the ground line of drive circuit substrate 18 through conductive member 50 was measured. As a bearing, 608 available from Minebea Co., Ltd. (grease having a consistency of 239 was used) was used.

Figure 3:
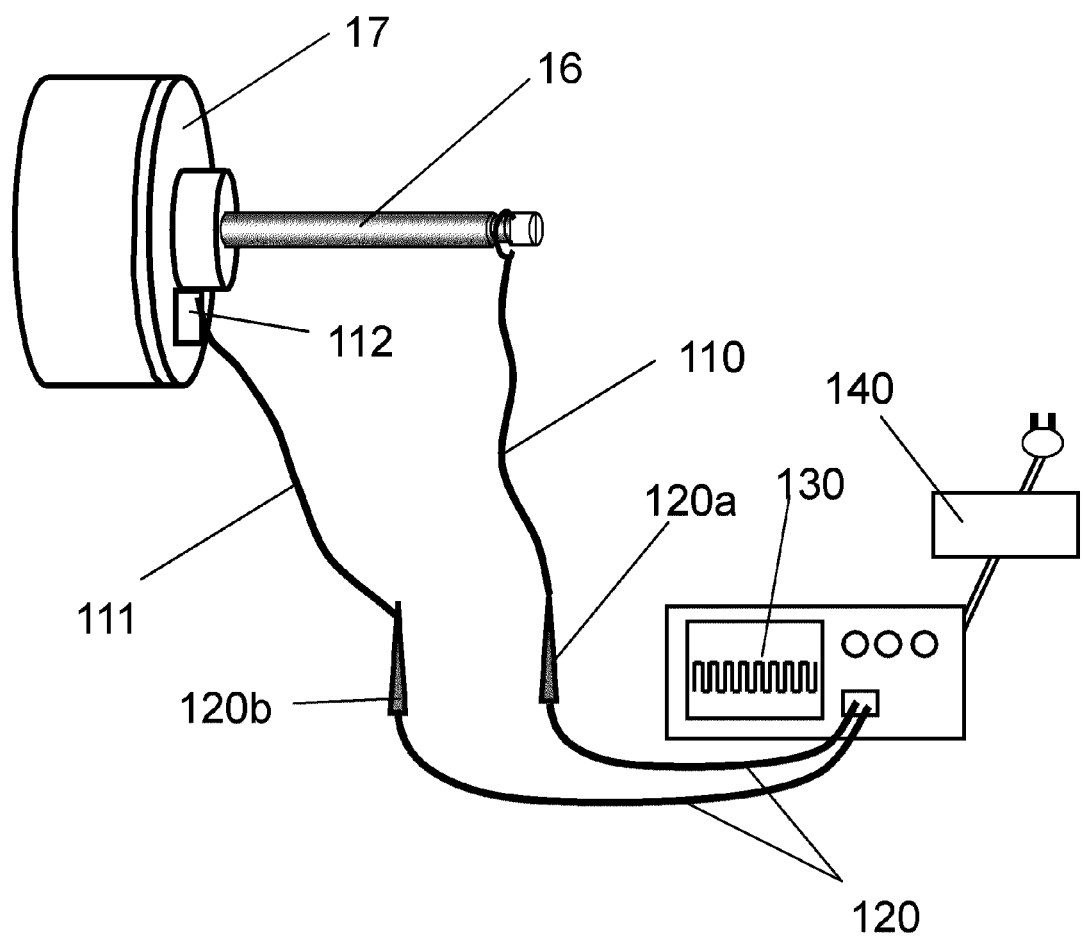
FIG. 3 is a diagram showing a method of measuring a shaft voltage in Example 1.

FIG. 3 is a diagram showing a method of measuring a shaft voltage in the present example. A DC stabilized power supply was used in a shaft voltage measuring state. The measurement was executed under the same operating conditions in which power supply voltage Vdc of the winding was set to 391 V, power supply voltage Vcc of the drive circuit was set to 15 V, and a rotating speed was set to 1000 r/min. The rotating speed was adjusted by control voltage Vsp, and an attitude of the brushless motor in an operating state was set to make the shaft horizontal.

In the measurement of the shaft voltage, voltage waveforms were observed with digital oscilloscope 130 (DPO7104 available from Tektronix, Inc.) and high-voltage differential probe 120 (P5205 available from Tektronix, Inc.), and an inter-peak measured voltage was set as the shaft voltage.

Time on the abscissa in a measuring state is set to the same condition, i.e., 50 µs/div in each of the following measuring conditions. Digital oscilloscope 130 is insulated by insulating transformer 140.

In addition, +side 120a of high-voltage differential probe 120 is electrically connected to shaft 16 such that a conductor of a lead wiring is formed in a loop-like shape having a diameter of about 15 mm through lead wiring 110 having a length of about 30 cm to bring the inner circumference of the conductor into conductive contact with the outer circumference of shaft 16. Meanwhile, side 120b of high-voltage differential probe 120 is electrically connected to bracket 17 such that a distal end of lead wiring 111 is brought into conductive contact with bracket 17 by conductive tape 112 through lead wiring 111 having a length of about 30 cm. With the configuration, a shaft voltage serving as a voltage between bracket 17 and shaft 16 was measured.

Comparative Example 1

In the brushless motor shown in FIG. 1, when stator iron core 11 and the ground line of drive circuit substrate 18 were not connected to each other, the shaft voltage was measured by the same method as that of Embodiment 1.

Table 1 shows measurement results of Example 1 and Comparative Example 1.

TABLE 1

|  | Comparative Example 1 | Example 1 |
| --- | --- | --- |
| Shaft voltage V | 21.0 | 7.8 |

As is apparent from Table 1, stator iron core 11 and the ground line of drive circuit substrate 18 are connected to each other to make it possible to lower the shaft voltage.

As is apparent from these results, the motor according to the present invention has a shaft voltage lower than that of a conventional motor and has a very beneficial effect on suppression of electric corrosion of a bearing of the motor.

Embodiment 2

Figure 4:
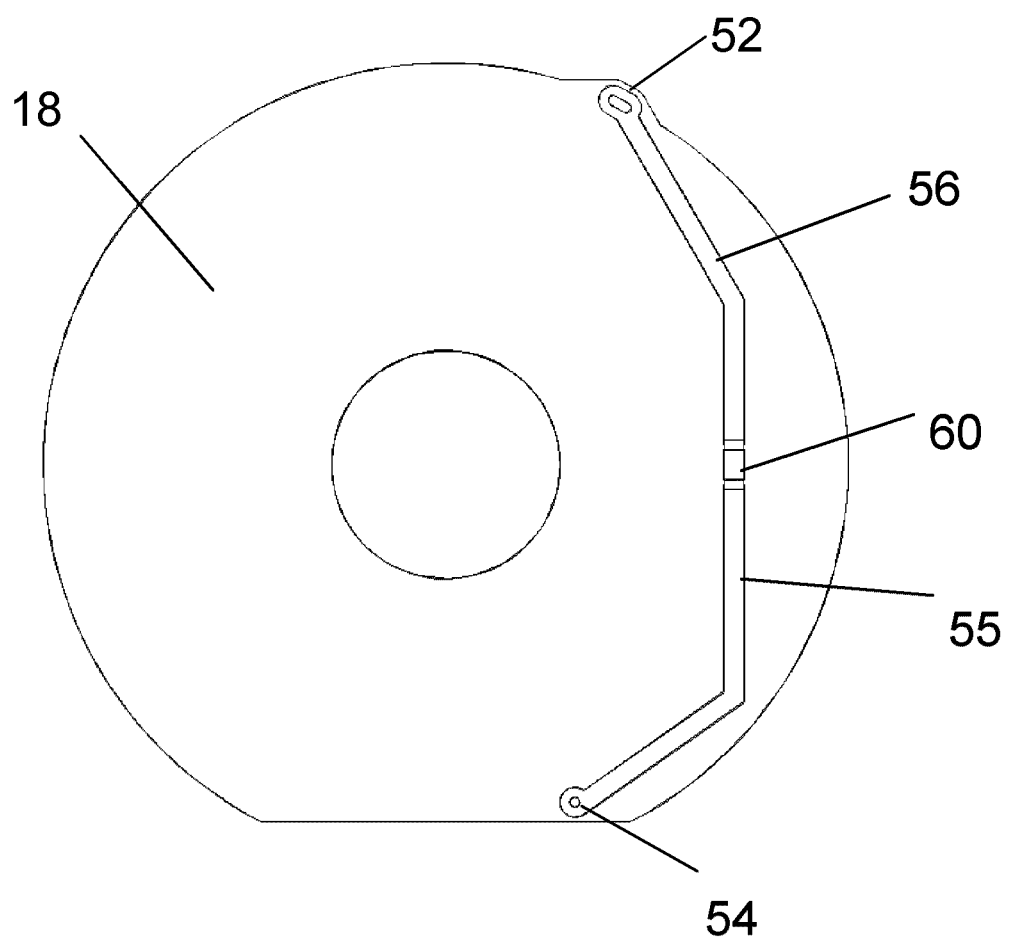
FIG. 4 is a diagram showing a configuration of a drive circuit substrate built in a motor in Embodiment 2 of the present invention.

FIG. 4 is a diagram showing a configuration of a drive circuit substrate built in a motor in Embodiment 2 of the present invention. Also on drive circuit substrate 18 shown in FIG. 4, as in drive circuit substrate 18 according to Embodiment 1, various electronic parts (not shown) are mounted, and the electronic parts are electrically connected to each other by a wiring pattern pattern-formed with a copper foil on drive circuit substrate 18. The motor according to the present embodiment has the same configuration as that of the brushless motor having the structure shown in FIG. 1, and a detailed description of the motor will be omitted.

In comparison with Embodiment 1, the brushless motor according to the present embodiment has a characteristic feature in that stator iron core 11 is electrically connected to ground wiring 41 serving as a reference point of a zero potential through iron core connection terminal 51 serving as a conductive member and further capacitor 60. More specifically, as in Embodiment 1, in the configuration in which stator iron core 11 is electrically directly connected to ground wiring 41, stator iron core 11 is also directly connected to the ground of an electric device in which the brushless motor is incorporated through ground wiring 41. In this case, a high-frequency signal generated from stator iron core 11 may be transmitted to the electric device as noise. For this reason, in the present embodiment, capacitor 60 is arranged to suppress a signal level of the high-frequency signal transmitted from stator iron core 11 to the electric device through ground wiring 41.

In FIG. 4, ground wiring 41 included in connection wiring 40 is connected to ground connection terminal 54 of first ground pattern 55. First ground pattern 55 extends from ground connection terminal 54 on drive circuit substrate 18, and is connected to one end of capacitor 60. On the other hand, as in Embodiment 1, land 52 for connecting iron core connection terminal 51 is formed on drive circuit substrate 18. Second ground pattern 56 extends from land 52 on drive circuit substrate 18, and is connected to the other end of capacitor 60. In this manner, stator iron core 11 is electrically connected to ground wiring 41 through iron core connection terminal 51, second ground pattern 56, capacitor 60, and first ground pattern 55.

In this manner, the brushless motor according to the present embodiment, stator iron core 11 is electrically connected to ground wiring 41 through iron core connection terminal 51 and capacitor 60. For this reason, capacitor 60 functions as a noise filter to make it possible to suppress a high-frequency signal generated from iron core connection terminal 51 from being transmitted to an electric device. Since capacitor 60 can be mounted on drive circuit substrate 18, capacitor 60 can be easily manufactured.

Embodiment 3

In the present embodiment, a configuration of an air conditioner indoor unit will be described as an example of an electric device in the present invention.

Figure 5:
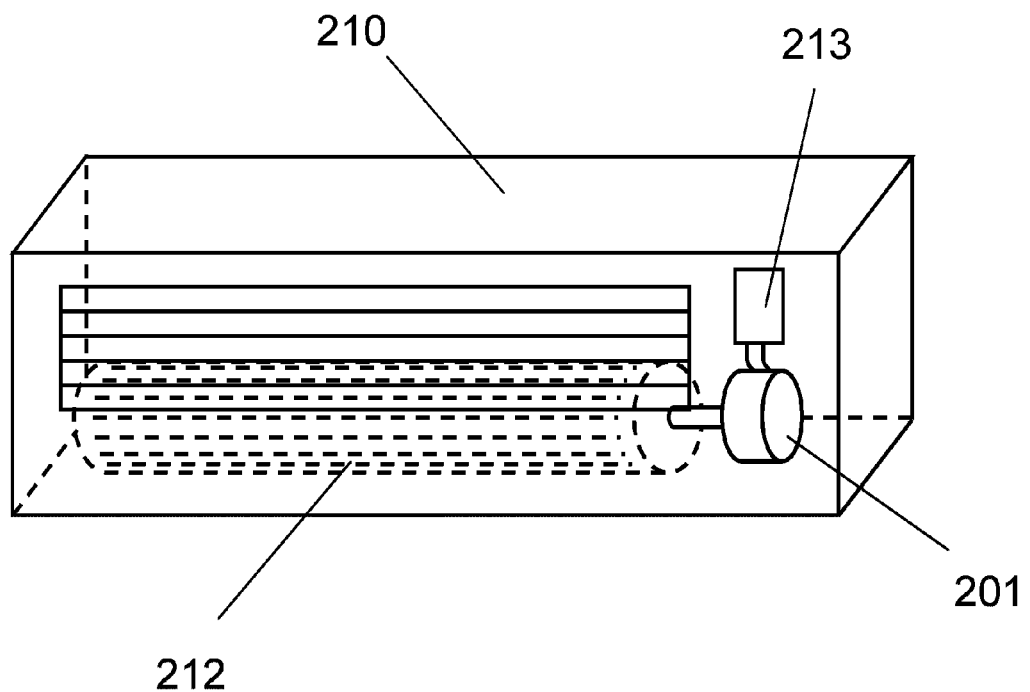
FIG. 5 is a pattern diagram showing a configuration of air conditioner indoor unit 210 as an example of an electric device in Embodiment 3 of the present invention.

FIG. 5 is a pattern diagram showing a configuration of air conditioner indoor unit 210 as an example of an electric device in Embodiment 3 of the present invention.

In FIG. 5, brushless motor 201 is installed in housing 211 of air conditioner indoor unit 210. Cross flow fan 212 is attached to a rotating shaft of brushless motor 201. Brushless motor 201 is driven by motor drive apparatus 213. Energization from motor drive apparatus 213 rotates brushless motor 201. Accordingly, cross flow fan 212 rotates. With the rotation of cross flow fan 212, air conditioned by a heat exchanger (not shown) for an indoor unit is sent into a room. As brushless motor 201, for example, the motor described in the above embodiment can be applied.

The electric device according to the present invention includes a brushless motor and a housing in which the brushless motor is installed. As the brushless motor, the motor according to the present invention having the above configuration is employed.

In the above description, as an example of the electric device according to the present invention, a brushless motor installed in an air conditioner indoor unit is employed. However, the present invention can also be applied to a brushless motor installed in an air conditioner outdoor unit, a motor installed in another electric device, for example, brushless motors used in various consumer electronics, brushless motors installed in various information devices, and a brushless motor used in an industrial machine.

As described above, the motor according to the present invention includes: a stator obtained by integrally molding a fixing member including a stator iron core on which a winding is wound with an insulating resin; a rotor arranged to face the stator about a shaft; a bearing that rotatably supports the shaft; a bracket that fixes the bearing; and a drive circuit substrate on which a drive circuit that drives the winding is mounted, wherein the stator iron core is electrically connected to a ground serving as a reference point of a zero potential on the drive circuit substrate through a conductive member.

For this reason, the potential of the stator iron core becomes a zero potential, and a shaft voltage can be reduced. Furthermore, since a high-frequency noise voltage generated by the stator iron core is prevented by a capacitor from being transmitted to a power supply for an electric device in which the motor is built, the electric device can be suppressed from being erroneously operated.

Therefore, according to the motor of the present invention, there can be provided a motor that suppresses electric corrosion from occurring in a bearing. The motor of the present invention is incorporated in an electric device to make it possible to provide the electric device including the motor that suppresses electric corrosion from occurring in a bearing.

In the present embodiment, an inner rotor type motor in which a rotor is rotatably arranged on an inner circumference side of a stator is described. However, in an outer rotor type motor in which a rotor is arranged on an outer circumference side of a stator and in a twin rotor type motor in which rotors are arranged on both inner and outer circumference sides, as described above, when a stator iron core and a ground of a drive circuit substrate are connected to each other, the same effect as described above can be obtained.

INDUSTRIAL APPLICABILITY

The motor according to the present invention can reduce a shaft voltage, and suitably suppresses electric corrosion from occurring in a bearing. For this reason, mainly in an electric device that requires a low-price and long-life motor, the present invention is advantageously applied to a motor installed in, for example, air conditioner indoor unit, an air conditioner outdoor unit, a water heater, an air purifier, and the like.

The invention claimed is:
1. A motor comprising:
a stator including a stator iron core and a winding wound thereon;
a rotor arranged to face the stator about a shaft;
a bearing rotatably supporting the shaft;
a bracket fixing the bearing; and
a drive circuit substrate having a drive circuit mounted thereon for driving the winding, wherein the stator iron core is electrically connected to a ground on the drive circuit substrate through a conductive member, wherein the ground on the drive circuit substrate is insulated from the earth and from a primary power supply circuit, fur- ther wherein the ground floats on the earth and the potential of the primary power supply circuit.

2. The motor according to claim 1, wherein an iron core connection terminal serving as the conductive member is connected to the stator iron core, and the iron core connection terminal is inserted into the drive circuit substrate to electrically connect the stator iron core with the ground.

3. The motor according to claim 1 further comprising
a capacitor electrically connected between the stator iron core and the ground in addition to the conductive member.

4. The motor according to claim 3, wherein the capacitor is arranged on the drive circuit substrate.

5. An electric device comprising a motor according to claim 1.

* * * * *